April 5, 1966 L. G. ROBERTS 3,244,808

PULSE CODE MODULATION WITH FEW AMPLITUDE STEPS

Filed Jan. 12, 1962 3 Sheets-Sheet 1

INVENTOR.
LAWRENCE G. ROBERTS
BY Kenway, Jenney & Hildreth
ATTORNEYS

INVENTOR.
LAWRENCE G. ROBERTS
BY Kenway, Jenney & Hildreth
ATTORNEYS

LEGEND (∧) = "and" gate (∨) = "or" gate (∿) = "inverter" gate

INVENTOR.
LAWRENCE G. ROBERTS
BY Kenway, Jenney & Hildreth
ATTORNEYS

United States Patent Office 3,244,808

Patented Apr. 5, 1966

3,244,808

PULSE CODE MODULATION WITH FEW AMPLITUDE STEPS

Lawrence G. Roberts, Boston, Mass., assignor, by mesne assignments, to Massachusetts Institute of Technology, a corporation of Massachusetts Filed Jan. 12, 1962, Ser. No. 165,772
6 Claims. (Cl. 178—6)

Figure 1:
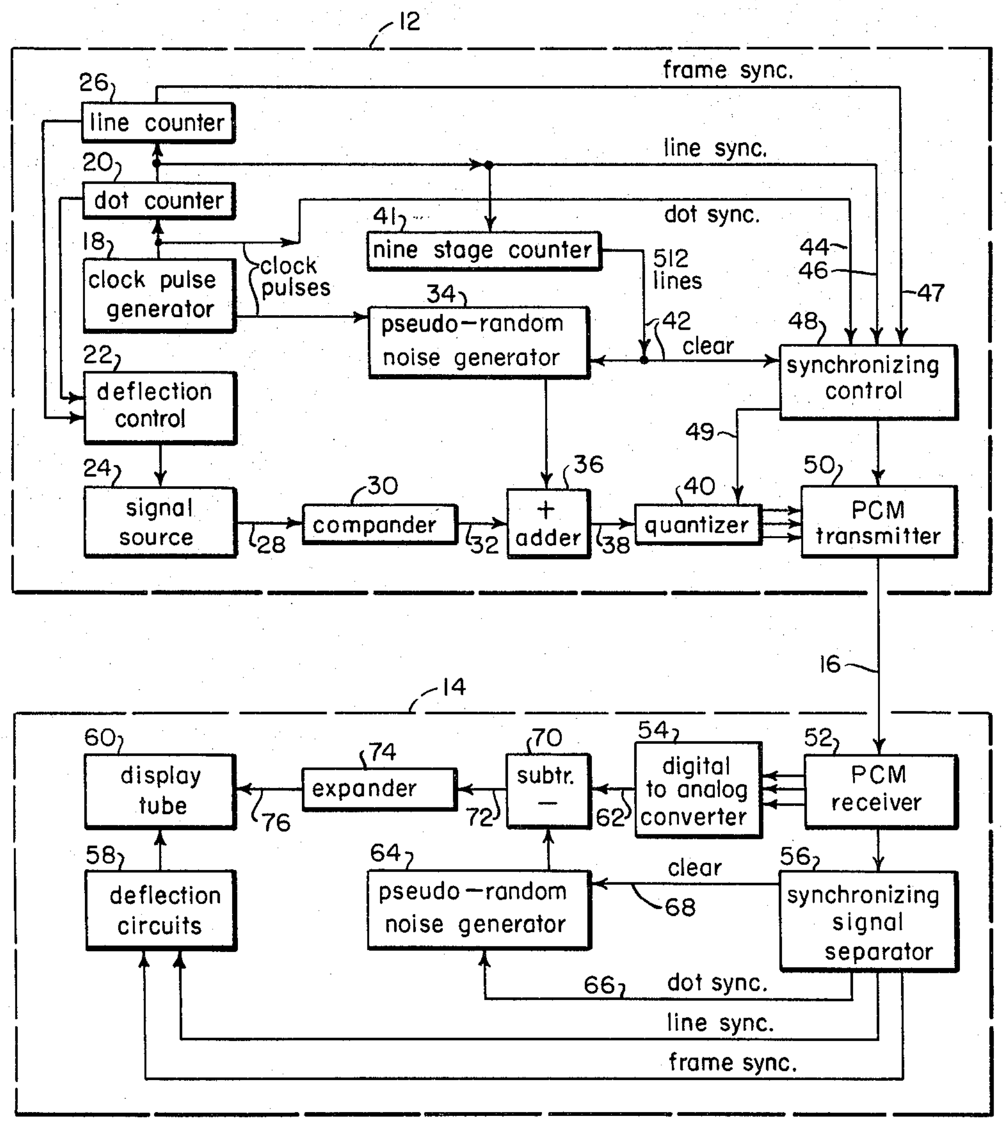

The present invention relates generally to transmission systems for signals varying as a function of applied information, including but not limited to television and facsimile transmission. More particularly, it concerns improvements in known transmission systems termed "pulse code modulation" or "PCM" systems. In these the transmission link transmits pulses representing the amplitude of an input or subject signal. These pulses represent digital numbers each corresponding to a discrete amplitude level of the signal which they represent.

A given television transmission link, which may be taken as exemplary, requires a minimum channel bandwidth in order to obtain the desired picture definition and contrast. For example, in standard television transmission which employs a link with a carrier substantially continuously amplitude modulated as a function of light intensity (as distinguished from PCM), a bandwidth of four megacycles is found to be acceptable. PCM links have been developed in order to overcome certain difficulties involved in the standard transmission link; but at the same time they raise additional difficulties including an increase in the required bandwidth for comparable contrast and definition quality, which it is an object of this invention to solve.

The objects of this invention may be further understood from a consideration of a television PCM link of known form. A picture signal is generated in a conventional iconoscope tube by scanning a raster across a picture with an electron beam, and generating a continuously amplitude-modulated subject signal. This signal varies in amplitude as a function of the brightness of the light in that part of the picture upon which the beam is momentarily projected. Instead of modulating the carrier frequency with this voltage as in standard transmission, the voltage is first fed to a quantizer. The quantizer has a number of output leads each representing a separate order or "bit" in a binary digital system. The full range of input voltage values is equally divided into as many voltage intervals as the given number of bits may represent uniquely. Thus for "$n$" bits the range would be divided into "$2n$" intervals. A source of pulses is also provided. The amplitude of the subject signal is sampled at the moment of each pulse and the pulse is gated to a combination of the output leads according to the voltage interval in which the subject signal falls at the moment of sampling, as shown by the first two columns of the following Table I for a simple 2-bit quantizer taken for purposes of simplified illustration. The transmission of the bit data to the receiver is accomplished by a conventional pulse code transmitter.

TABLE I

| Signal Voltage Interval As a Fraction of Maximum Picture Brightness | 2-Bit Binary Code | Resulting Signal Amplitude Level |
|---|---|---|
| 0–¼ | 0 0 | ⅛ |
| ¼–½ | 0 1 | ⅜ |
| ½–¾ | 1 0 | ⅝ |
| ¾–1 | 1 1 | ⅞ |

At the receiver of the assumed known form of television PCM link, a digital-to-analog converter produces a picture brightness signal having discrete levels of amplitude resulting from the binary codes, these levels being preferably the median values of the respective voltage intervals. The resulting signal levels are shown in the third column of Table I.

One difficulty with this type of system is that picture quality is reduced by the resulting visibly sharp separations in brightness levels, unless the number of bits is increased to about six. Since each bit requires about the same channel width as the entire channel required for standard transmission, this PCM system requires twice the bandwidth of a standard system to produce a picture of poorer quality, and about six times the bandwidth to produce a picture of comparable quality. It is an object of this invention to provide means for achieving better picture quality by utilizing fewer bits, hence a narrower bandwidth than that required in the known PCM systems.

In more general terms, it is an object of this invention to provide means for PCM transmission of any signal varying according to applied information, with fewer bits for comparable quality of reproduction than the number required in the known PCM systems.

Another object is specifically to provide a television PCM transmission system of the above type adapted for use in microwave relay and cable transmissions.

With the above and other objects hereinafter discussed in view, a principal feature of this invention resides in the provision of a first noise source at the transmitter which adds noise to the picture signal before it reaches the quantizer, and a second noise source at the receiver which subtracts the same noise signal from the signal produced by the digital-to-analog converter. A suitable generator may be provided which produces pseudo-random noise. As a result of this arrangement a general area of uniform brightness in the picture at the transmitter, for example, is represented on the transmission link by different digital codes varying as a function of the superimposed noise. After conversion of these codes to median analog values and subtraction of the noise values in the receiver, the brightness signal generally will not remain at the identical value throughout the given area of the transmitted picture. However, the eye averages the light values seen over the given general area on the display tube. With averaging, the brightness of the given area appears closer to the original and the picture appears to have less noticeable separations in levels of brightness for the given number of bits, as compared with the assumed known PCM system. The net result is that contrast quality has been improved at some expense to definition, but the net effect is more satisfactory to the viewer.

Figure 2:
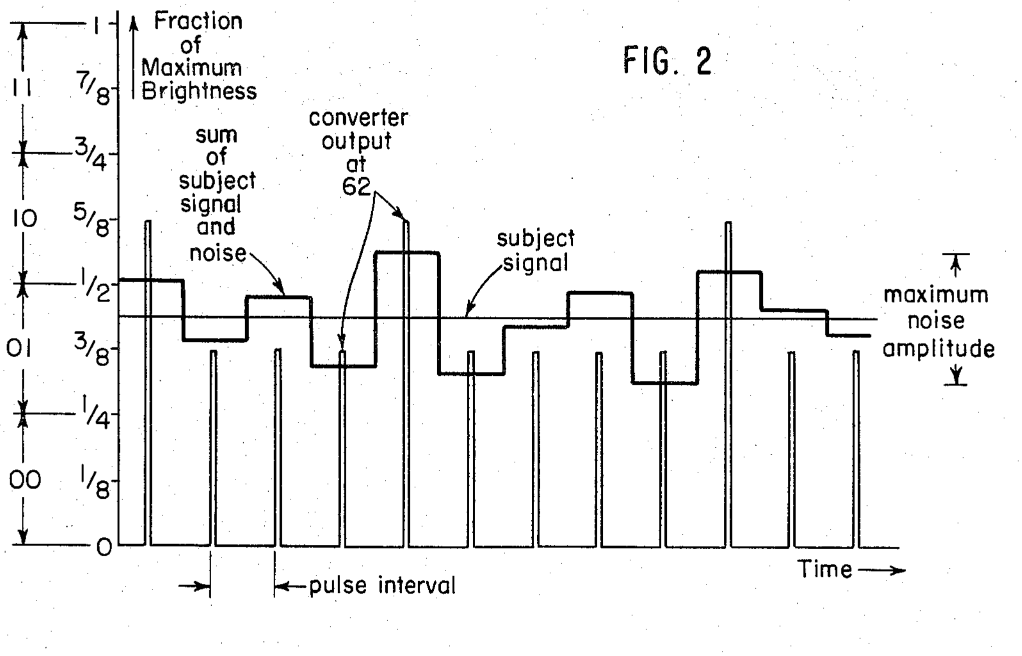
Figure 3:
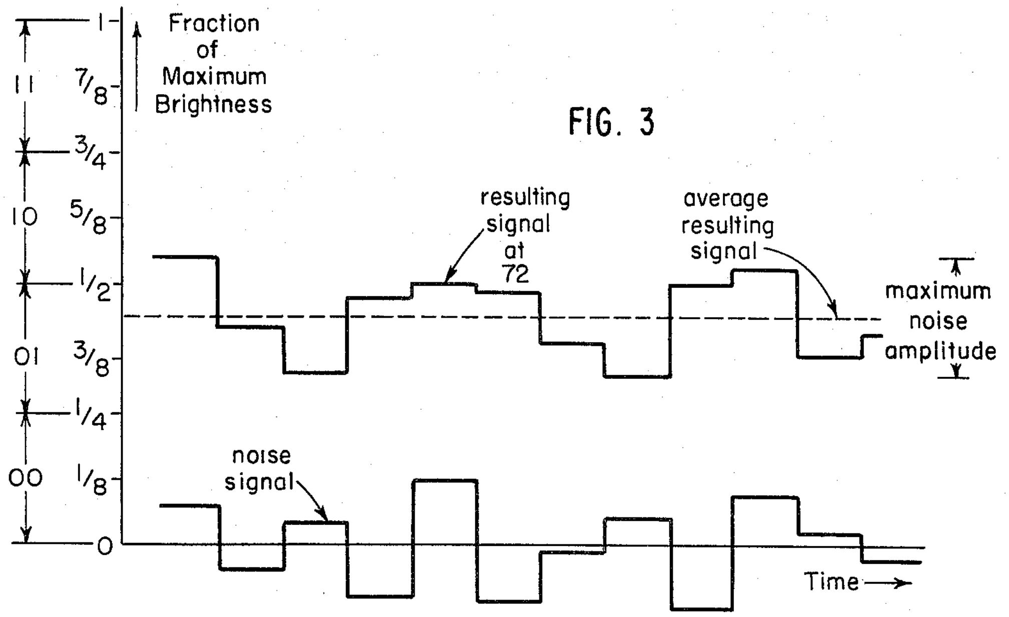
Figure 4:
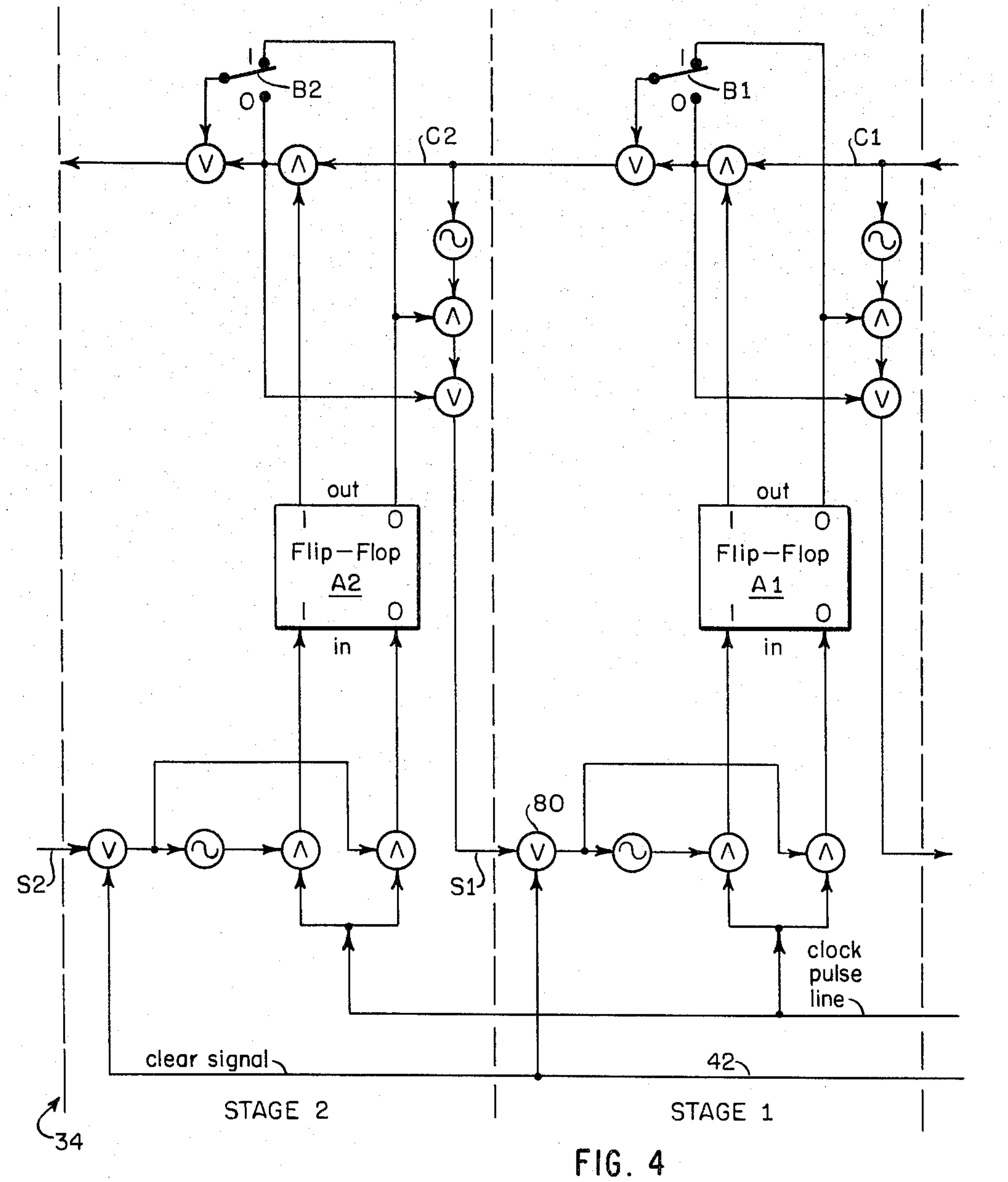

Other features of the invention reside in certain details of the circuits and in arrangements and adaptations of and relationships between the components which will become evident from the following description of a preferred embodiment, having reference to the appended drawings in which FIG. 1 is a block diagram of a PCM television transmission system embodying the invention and comprising a preferred form thereof;

FIGS. 2 and 3 are time diagrams of signal values produced by the system of FIG. 1 for an assumed steady-state transmitter picture signal taken by way of example; and FIG. 4 is a schematic diagram of a suitable form of noise generator of the computer type, for use in the apparatus of FIG. 1.

Referring to FIG. 1, there is shown a television transmitter 12 and a receiver 14, which may be connected by any desired pulse code transmission link 16 of conventional form. In the transmitter, a clock pulse generator 18 provides a continuous series of clock pulses which are sent to a dot counter 20. The latter is connected to a deflection control 22 and controls horizontal deflection of the beam in a signal source 24, for example a television inconoscope tube. A line counter 26 is advanced by the dot counter after each 525 clock pulses and produces vertical deflection in the control 22. In this manner a raster is scanned stepwise in the source 24, and a subject signal output produced on a lead 28 comprises a continuously amplitude-modulated voltage varying with the brightness of the picture at each point in the raster. All of the foregoing is similar to conventional circuits used in PCM television transmission.

The signal on the lead 28 is transferred to a compander 30, the output of which at 32 varies approximately as the logarithm of the input. The logarithm varies more rapidly with changes in the input at low levels of brightness. These changes will therefore occupy a relatively larger portion of the range between the output values at 32 which represent the minimum and maximum brightness levels. The purpose of the compander is to compensate for the fact that the human eye is more sensitive to variations in dark areas than it is to variations in bright areas. By utilizing a predominate part of the available range of signal values to represent the variations in dark areas, the error later introduced by pulse code modulation is less in the dark areas than in lighter areas and a visible improvement in picture quality results. This form of compensation and suitable compander circuits are well known in the art. While these are not necessary to the present invention they are preferred for use with it as a complementary means of improving the picture quality.

A noise generator 34 is provided, the output of which is added in an adder 36 to the output of the compander 30 to produce at 38 a signal which is sent to a quantizer 40 of the type hitherto known in the art.

The generator 34 may be constructed in any one of many known forms. These may produce a signal which varies continuously or on which varies continually in stepwise fashion. Preferably, the output is very random in amplitude, and the peak-to-peak output amplitude preferably equals one "voltage interval" of the signal on the lead 32. It will be noted that this interval is determined by dividing the full range of amplitude on the lead 32 by "$2^n$," where "$n$" equals the number of bits. The noise signal is exactly reproducible in the receiver, preferably by a similar noise generator.

The form of the generator 34 hereinafter described in relation to FIG. 4 is of the type which produces a stepwise continually variable pseudo-random signal, that is, step voltages at a number of different amplitudes constituting a pattern which repeats after about 512 lines. It utilizes an 18-stage digital shift register advanced by clock pulses from the clock generator 18. In order that the noise signal will be in a quiescent state during moments of sampling, the latter are delayed one-half a pulse interval in relation to the clock pulses. The line count pulses also advance a nine-stage binary counter 41 which clears itself and the generator 34 every 512 lines by a "clear" signal on a lead 42 in order to synchronize the noise patterns of the transmitter and receiver noise generators, as further shown below.

The described system assumes a conventional television frame of 525 lines, and therefore the clear signals will be out of synchronism with the frame rate. This lack of synchronism produces an advantage in certain cases, in that the eye may be able to detect the noise pattern in the picture if the pattern and the frame are synchronized. However, this is not always the case, and a simplified version of the circuit may be employed in which the counter 41 is eliminated and the clear line 42 is connected to the frame synchronizing signal emanating from the line counter 26.

The clear signal lead 42 and dot, line and frame synchronizing pulse leads 44, 46 and 47 are connected to a synchronizing control 48 which introduces a delay of approximately one-half a pulse interval in all pulses. The delayed clock pulses are sent over a lead 49 to operate the quantizer. The control 48 produces synchronizing signals for transmission in the conventional manner. The clear signal is transmitted in the same manner as the dot, line and frame synchronizing signals.

The quantizer 40 in the preferred system provides three bit data, and hence discriminates between eight ranges of signal values on the lead 38. A three-digit binary signal is produced by sampling the signal value on the lead 38 at the moment of each dot pulse according to the first two columns of the following Table II.

TABLE II

| Range of Signal On Lead 38 | 3-Bit Binary Code | Converted Voltage Level On Lead 62 |
|---|---|---|
| 0–⅛ | 0 0 0 | 1/16 |
| ⅛–¼ | 0 0 1 | 3/16 |
| ¼–⅜ | 0 1 0 | 5/16 |
| ⅜–½ | 0 1 1 | 7/16 |
| ½–⅝ | 1 0 0 | 9/16 |
| ⅝–¾ | 1 0 1 | 11/16 |
| ¾–⅞ | 1 1 0 | 13/16 |
| ⅞–1 | 1 1 1 | 15/16 |

A PCM transmitter 50 of conventional form is provided but is not described in detail herein.

A PCM receiver 52 of conventional form receives the transmitted signals and directs the three bits of picture data to a digital-to-analog converter 54, also of conventional form. The other pulses are received and differentiated by a synchronizing signal separator 56. The line and frame pulses pass to deflection circuits 58 of a display tube 60.

The converter 54 converts the digital data to analog amplitude-modulated pulse values as in the conventional PCM reception system. The output analog signals on a lead 62 have the median amplitudes of the ranges represented by the respective binary codes, as shown in the third column of Table II.

A pseudo-random noise generator 64 identical to the generator 34 is advanced by the dot signals on a lead 66 and cleared by a clear signal on a lead 68. Thus it produces the identical noise signal produced by the generator 34 and one-half a pulse interval lagging in phase. The noise signal is connected to a subtracting circuit 70 which subtracts the noise signal from the signal on the lead 62 after converting the latter to a step voltage sustaining each pulse level for afull pulse interval. The difference signal passes over a lead 72 to an expander circuit 74. The latter determines the inverse function of the compander 30 in the transmitter and produces a resulting brightness signal on a lead 76 connected to the display tube.

An appreciation of the advantages of the invention, and in particular the advantages in the introduction and later subtraction of pseudo-random noise, may be gained from FIGS. 2 and 3. For simplicity these figures assume a two-bit transmission system, but it will be evident that the same principles apply to three or more bits as well.

In FIG. 2 a simple case is assumed in which the raster scans an area of uniform brightness represented by a subject signal value of 7/16 where the maximum brightness is one, throughout the time interval shown. To further simplify this explanation it is assumed that no companding is applied. In a conventional two-bit PCM system, since the given signal value is in the "01" range the receiver would reproduce the median brightness level of that range, which has the value ⅜. According to the present invention, however a noise signal is added to the brightness signal and the quantizer produces different digital data for different pulses according to the corresponding values of the sum. FIG. 2 also shows the corresponding digital-to-analog converter output pulses in the receiver.

Referring next to FIG. 3, the identical noise signal of FIG. 2 is reproduced on the time axis in lagging relationship thereto as generated in the receiver by means of the dot pulses. The resulting signal sent to the display tube has an amplitude determined by subtracting the noise value from the corresponding converter output pulse value shown in FIG. 2. The brightness produced on the display tube during the time period depicted will therefore vary in value, but will be averaged by the eye and will appear in general to have approximately the same brightness as an area with a brightness value of 7/16. Thus, even though the scanned area of uniform brightness is reproduced with noise or "snow," the average brightness in the area on the display tube will be less in error than in the case of a conventional PCM link, and the contrast between this area and slightly brighter areas will not result in a sharp separation of brightness on the display tube.

FIG. 4 shows the circuit diagram in schematic form for a noise generator of a suitable type to be employed in the present invention. This generator is a pseudo-random binary ring-connected shift register. The binary output values of the generator are converted to analog form by a conventional converter circuit similar to the converter 54, omitted from the drawing for simplification. The stepwise advancement of the generator is accomplished by clock pulses from the generator 18 as previously described.

In the preferred form, the pseudo-random noise generators 34 and 64 have eighteen stages of which two are shown in FIG. 4. Each stage has a flip-flop device "A" with two stable outputs "0" and "1," and a switch B used for pre-setting an initial binary value in the register when the clear signal is received. Each stage also includes "and," "or" and inverter gates of the type familiar in the computer art. The circuit utilizes "level logic," that is, the voltages at different points remain substantially constant throughout the intervals between clock pulses, and may be either at a "0" or "1" level. The clock pulses are relatively short compared to the pulse interval. The legend for the various circuit components appears in the drawing.

The characteristic properties of the circuit illustrated include carry-up leads C and carry-down leads S for each stage. The conditions for a "1" carry-up C2 from the stage 1 are written as follows:

$$C2=(A1)'(B1)+(A1)(C1) \tag{1}$$

that is, the carry-up level C2 is "1" in either of two cases: first when the flip-flop A1 is at "0" (denoted by an asterisk) and the switch B1 is as "1"; and second, when the flip-flop A1 is at "1" and the carry-up C1 is at "1."

The conditions for a carry-down S1 from the stage 2 are similarly written as follows:

$$S1=(C2)'(A2)'+(C2)(A2) \tag{2}$$

The conditions which result in a shift of an A flip-flop depend on the S-levels. Thus, for example, assuming the clear signal line to be at "0" level when a clock pulse arrives, the flip-flop A1 is switched to "1" if S1 is at "0" and to "0" if S1 is at "1."

All stages are set to "0" by a clear signal on the line 42 because this signal has the same effect on each stage as an S-level of "1." It will be understood that the "or" circuits such as 80 are non-exclusive, that is, they have "1" outputs when either one or both of the inputs are at "1."

The clear signal is of sufficient duration to coincide with at least one clock pulse; hence, it is a level signal rather than a pulse.

The B-switches of the pseudo-random noise generators 34 and 64 in both transmitter and receiver are set to the same binary numbers, whereby the stages reach the same binary number as a "starting point" on the next clock pulse after the clear signal. In the given 18-stage register the number 011 101 101 110 111 000 may be set in the B-switches for example. A stage is set to "0" in this way if its B-switch is set to "0" and to "1" if its B-switch is set to "1." This is further explained as follows.

After resetting all A flip-flops are in the "0" condition. If the B-switch in any given stage is at "0," the carry-up level from the stage is "0" as shown by Equation 1. From this, it follows that the carry-down to that stage is "1" by the first term of Equation 2. The clock pulse therefore sets the A flip-flop of the stage to "0."

Conversely, if the B-switch in any given stage is at "1," the carry-up level from the stage is "1" by the first term of Equation 1. From this, it follows that the carry-down to that stage is "0" as shown by Equation 2. The clock pulse therefore sets the A flip-flop of the stage to "1."

By inspection of the circuit, it will be seen that if each generator is always to be preset to the same number, the B-switches could be replaced by permanent connections and those stages to be preset to "0" could be simplified by shunting and eliminating the "or" gates in the corresponding carry-up circuits.

From the foregoing description it will be evident that a memory-less television PCM system has been described which, with three-bit sampling data, is able to produce with an economy of equipment a picture of comparable quality to that of a conventional six-bit system, and which requires only about half the bandwidth required by the latter. This is accomplished merely by the addition of a noise source and an associated adder or subtracting circuit in the transmitter and receiver, together with means to keep the noise sources in synchronism. The noise sources produce identical signals so that the value added to a sample in the transmitter is the same value subtracted from the same sample in the receiver. The term "noise" is described herein as including both random noise and noise produced by a programmed computer so designed that the probability of occurrence of any given output level in a specified range of possible levels at any given instant of sampling is essentially equal to that for any other output level in that range.

While the above described system includes a specific type of noise generator in the transmitter and receiver together with means to keep them in synchronism, this is only one possible means. Other means include the use of pre-taped noise signals or signals prepared in advance on other parts of mechanical sound-reproducing instruments. The play-back must, in such cases, be synchronized as in the described case. In general, any means for producing the same noise signal in both the transmitter and the receiver can be employed in carrying out the teachings of this invention. Thus any reproducible signal source having appreciable random qualities and means for synchronization may be employed as a noise generator in both transmitter and receiver.

The frequency of the noise generator clear signal can be increased somewhat above the illustrated rate of 512 lines. For example, a repetition interval of one-quarter the duration of a single frame can be used successfully.

It will be understood that the invention is not limited to television, but may also be employed in facsimile systems, in which a two-dimensional surface containing stationary pictorial, graphic or text information is reproduced in a single frame sweep or in repeated frames for visual persistence or photographic exposure. Also, the invention may be employed in cases where the subject signal is itself composed of a plurality of signals. For example, in telephonic cable transmission a number of phone circuits may be arranged for consecutive connection to the transmission cable by means of a commutator. A similar commutator may be employed at the receiving end to sort out the circuits. The transmitter commutator output may be connected to the lead 32 of FIG. 1 and the signal produced at the lead 72 may be the signal at the receiver from which the component phone circuits are to be sorted.

It will also be understood that numerous other variations in and adaptations of the described embodiment, in addition to those described above, may be accomplished by one skilled in this art, after reference to the foregoing specification, without departing from the spirit or scope of the invention.

Having thus described the invention, I claim:

1. Apparatus for television transmission including, in combination, a transmitter having a signal source to scan a picture having areas of variable lightness by tracing a raster of lines thereon to produce a first signal varying in amplitude as a function of said variable lightness, means to produce clock pulses repeating at a rate equal to the rate of tracing closely spaced points to be sampled in each line, a first pseudo-random step function generator advanced sequentially by the clock pulses to produce a second signal having a step pattern repeating only after a substantial number of lines, means to produce a third signal having an amplitude varying as the sum of the amplitudes of the first and second signals, a quantizer actuated by the clock pulses to sample the third signal and to classify each sample as falling within a particular one of a plurality of of amplitude steps, and pulse code transmission means for the clock pulses and the output of the quantizer, and a receiver having a digital-to-analog converter for the output of the transmitter, a second pseudo-random step function generator advanced sequentially by the transmitted clock pulses to produce a fourth signal identical to the second signal, and means to produce a resulting signal having an amplitude varying as the difference between the amplitudes of the converter output and the fourth signal.

2. The combination according to claim 1, in which the second signal has a maximum amplitude no greater than the difference between successive amplitude steps.

3. The combination according to claim 1 in which the lines comprise a frame and the pseudo-random step generators have reset means for commencing a new pattern not more often than once in each frame.

4. The combination according to claim 1 with means to delay the clock pulses a fraction of a pulse interval to cause the sampling to occur in the quiescent state of the first pseudo-random step function generator.

5. The combination according to claim 1 in which the lines comprises a frame, and including a converter for the lines adapted to produce a reset signal for the first pseudo-random step generator after a number of lines which is smaller than the number thereof in a frame, said transmitter sending said reset signal to the receiver and said receiver causing said reset signal to reset the second pseudo-random step generator.

6. The combination according to claim 1, in which the lines comprise a frame and the first and second pseudo-random step generators comprise ring-connected shift registers, and further including means to clear the registers to cause a repetition of their output patterns at a rate out of synchronism with the frame whereby no part of the pattern is repeated more often than once in the frame.

References Cited by the Examiner

UNITED STATES PATENTS

| | | | |
|---|---|---|---|
| 2,625,604 | 1/1953 | Edson | 178—6 |
| 2,669,608 | 2/1954 | Goodall | 325—42 |
| 2,725,425 | 11/1955 | Sziklai | 178—6 |

DAVID G. REDINBAUGH, *Primary Examiner.*